United States Patent [19]
Kerr

[11] Patent Number: 5,957,794
[45] Date of Patent: Sep. 28, 1999

[54] CONTINUOUSLY VARIABLE ALL SPEED TRANSMISSION

[76] Inventor: Phillip L. Kerr, 473 Louise Ave., Los Alamos, N.Mex. 87544

[21] Appl. No.: 09/096,490

[22] Filed: Jun. 12, 1998

[51] Int. Cl.⁶ .............................. F16H 7/08; F16H 7/22; F16H 7/02; F16G 1/28
[52] U.S. Cl. ..................... 474/111; 474/122; 474/149; 474/150; 474/167; 474/204; 474/243
[58] Field of Search .................... 474/29, 30, 31, 474/101, 8, 11, 12, 17, 18, 69, 70, 109, 110, 111, 119, 122, 148, 149, 150, 166, 167, 174, 198, 202, 203, 204, 237, 239, 240, 243

[56] References Cited

U.S. PATENT DOCUMENTS

| | | | |
|---|---|---|---|
| 4,048,863 | 9/1977 | Pemberton | 474/167 |
| 4,367,067 | 1/1983 | Chao | 474/154 |
| 4,650,445 | 3/1987 | Mott | 474/201 |
| 4,676,768 | 6/1987 | Miranti, Jr. et al. | 474/201 |
| 4,692,128 | 9/1987 | Sadler | 474/8 |
| 4,798,567 | 1/1989 | Hoshiro et al. | 474/242 |
| 4,820,242 | 4/1989 | Sato | 474/8 |
| 4,900,294 | 2/1990 | Schneeberger | 474/167 |
| 5,518,460 | 5/1996 | White, Jr. et al. | 474/167 |

*Primary Examiner*—Thomas R. Hannon
*Assistant Examiner*—Matthew A. Kaness
*Attorney, Agent, or Firm*—Norman B. Rainer

[57] ABSTRACT

A continuously variable all speed transmission apparatus employs a conically-shaped driven surface which is frictionally contacted by a taut endless compliant transmission member that extends to a circular power source such as the pedal hub of a bicycle. The driven surface is centered upon an axis upon which an axle is disposed that causes rotation of a wheel such as a bicycle wheel. A shifting mechanism moves the contact site of the transmission member axially along the driven surface, thereby producing variation in the rotational speed of the wheel. The transmission member includes a central wire and a series of rollers disposed upon the wire in a manner to rotate about the wire without moving longitudinally thereupon.

12 Claims, 5 Drawing Sheets

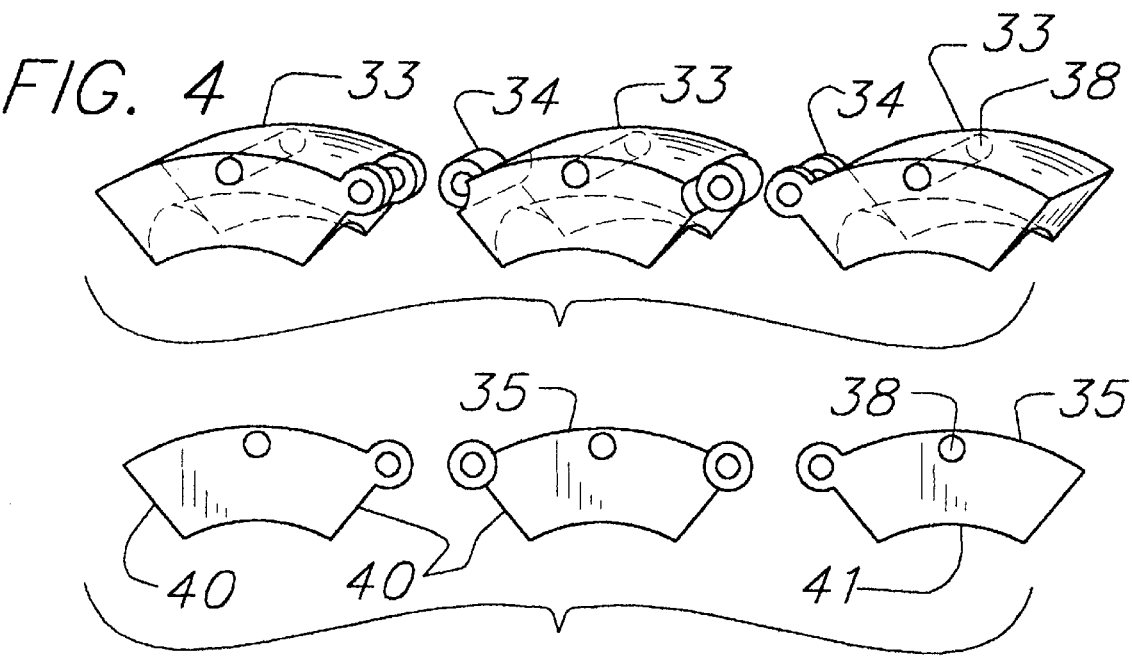
FIG. 4
FIG. 5
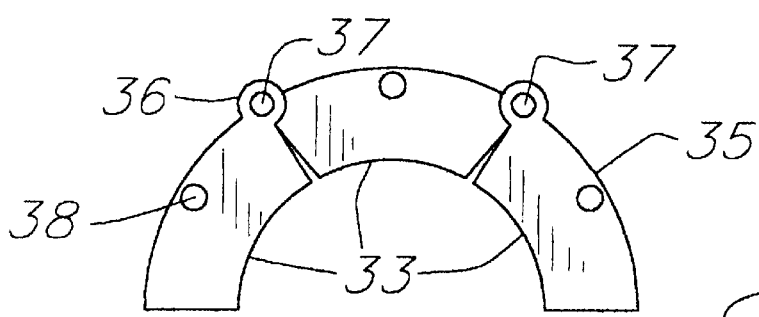
FIG. 5A
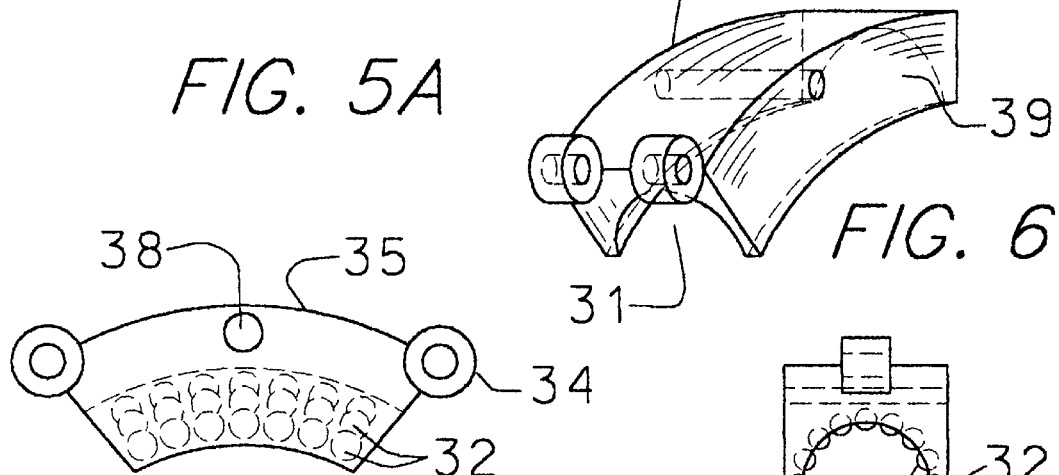
FIG. 6
FIG. 6A
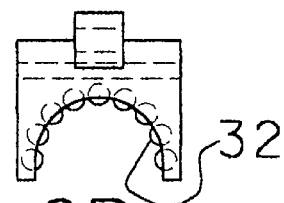
FIG. 6B

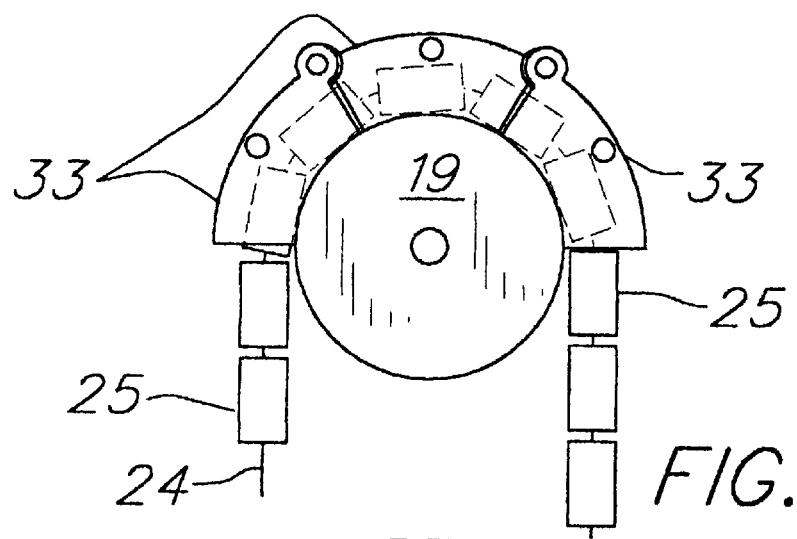
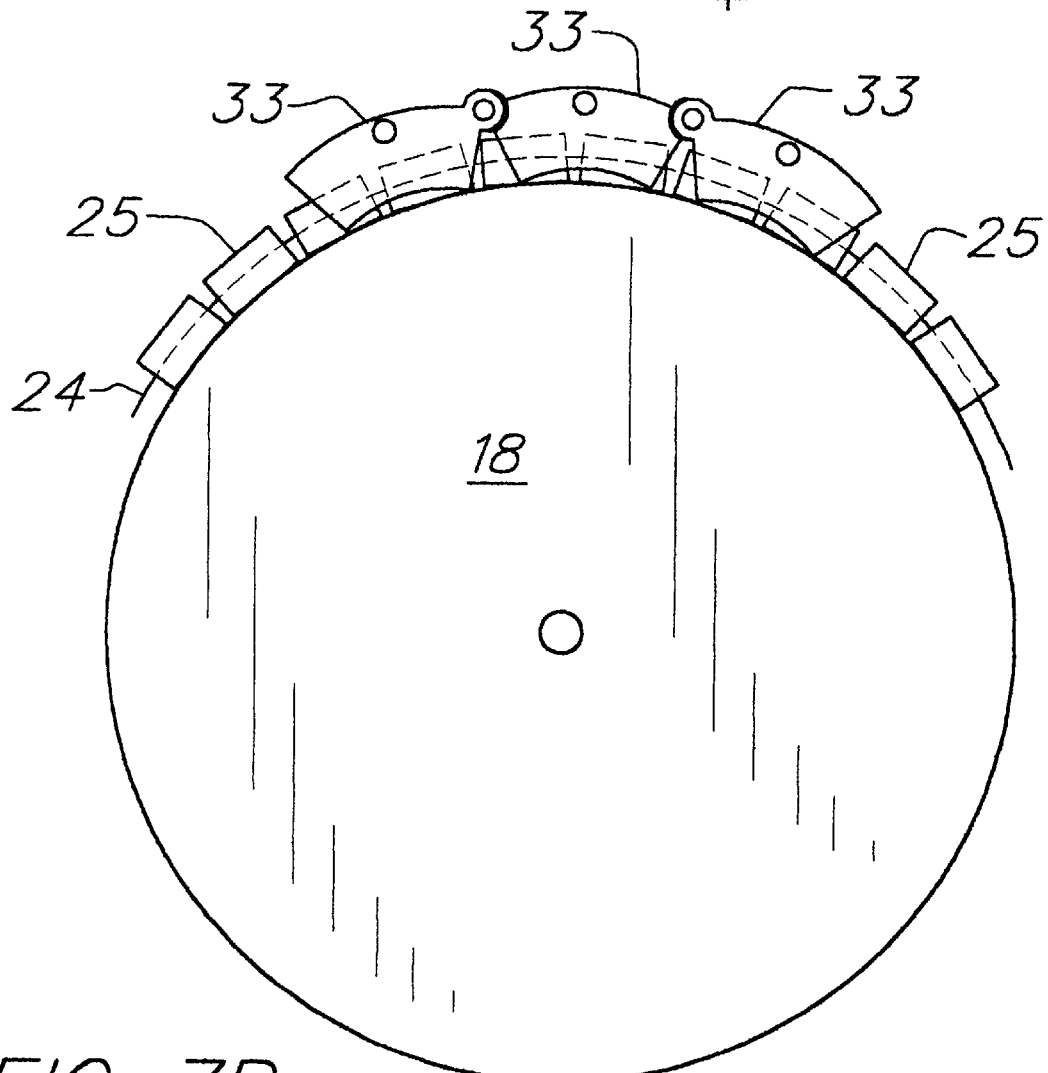

CONTINUOUSLY VARIABLE ALL SPEED TRANSMISSION

BACKGROUND OF THE INVENTION

1. Field of the Invention

This invention relates generally to positive drive stepless transmissions, and more particularly concerns a variable speed transmission apparatus having energy transferring means extending interactively between rotating driving and driven members.

2. Description of the Prior Art

Positive drive stepless transmissions have earlier been disclosed in U.S. Pat. Nos. 4,367,067; 4,650,445; 4,676,768; 4,692,128; 4,798,567; 4,820,242 and elsewhere. In general, such transmission devices are characterized in having a rotating drive member and a rotatable driven member having a tapered or conical surface. The axles of both the drive and driven members are in a parallel spaced apart relationship. An endless loop compliant energy transfer means such as an inextensible transmission belt or chain extends between said drive and driven members in tight frictional engagement therewith. A shifting device is provided which can move the belt or chain along the conical surface of the driven member. When the chain is positioned to act upon that portion of the conical surface having smallest circular diameter, the driven member will rotate at relatively high speed, whereas when the chain acts upon that portion of the conical surface having larger effective circular diameter, the driven member will be caused to rotate at a relatively low speed.

Difficulties have been encountered in shifting the transmission belt or chain, especially at the stopped state and at low speeds of operation. The apparatus of U.S. Pat. No. 4,367,067 seeks to overcome such shifting difficulty by employing a transmission chain equipped with laterally moveable ball bearings that interact with undulating surfaces within V-shaped grooves in drive and driven sheaves.

Other difficulties encountered in continuously variable transmissions include poor efficiency with which the transmission belt or chain interacts with the conical surface of the driven member, and rapid wear of component parts, especially the conical surface. Complexity of construction has been another obstacle to the more widespread use of such transmission devices, especially in bicycles.

It is accordingly an object of the present invention to provide a continuously variable stepless transmission device having improved operation at low and zero speeds.

It is another object of this invention to provide a transmission device as in the foregoing object having an endless transmission means which achieves improved driving contact with a conical driven member.

It is a further object of the present invention to provide a transmission device of the aforesaid nature of simple construction amenable to low cost manufacture.

These objects and other objects and advantages of the invention will be apparent from the following description.

SUMMARY OF THE INVENTION

The above and other beneficial objects and advantages are accomplished in accordance with the present invention by a continuously variable all speed transmission comprising:

a) a conically-shaped driven surface centered upon a horizontally disposed axis of rotation, b) a circular power source rotating upon a shaft parallel to said axis of rotation, c) an endless compliant transmission member oriented in a plane substantially orthogonal to said axis of rotation and having inside and outside perimeters, said inside perimeter tautly contacting said conically-shaped surface and said power source, said transmission member being comprised of a central compliant wire of endless loop configuration and a multitude of identical rollers installed upon said wire and adapted to rotate about said wire while resisting movement along the length of said wire, said transmission member being disposed in a manner to define upper and lower portions that move in opposite directions, d) shifting means for moving said transmission member axially with respect to said axis of rotation while maintaining said inside perimeter in contact with said driven surface, e) a housing which rotatably supports said conically-shaped driven surface, f) guide means associated with said housing for controlling the movement of said shifting means, and g) spring-activated tensioning means interactive with said upper and lower portions of said transmission member to maintain said transmission member at a uniform tension.

In a preferred embodiment of the invention, said rollers are comprised of mating halves which can be snap-fitted or otherwise installed onto said wire.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 4 is an enlarged perspective view of the shifting means of FIG. 1.

FIG. 5 is a side view of the shifting means of FIG. 4.

FIG. 5a is a side view of the shifting means of FIG. 4 shown in a joined interactive state.

FIG. 6 is a further enlarged fragmentary perspective view of the shifting means of FIG. 1.

FIG. 6a is a sectional side view of the shifting means of FIG. 6, showing interiorly retained ball bearings.

FIG. 6b is a sectional end view of the shifting means of FIG. 6, showing interiorly retained ball bearings.

FIG. 7a is a fragmentary end view showing the transmission member and shifting means acting upon the narrow diameter extremity of the conical driven surface.

FIG. 7b is a fragmentary end view showing the transmission member and shifting means acting upon the large diameter extremity of the conical driven surface.

DESCRIPTION OF THE PREFERRED EMBODIMENT

Figure 1:
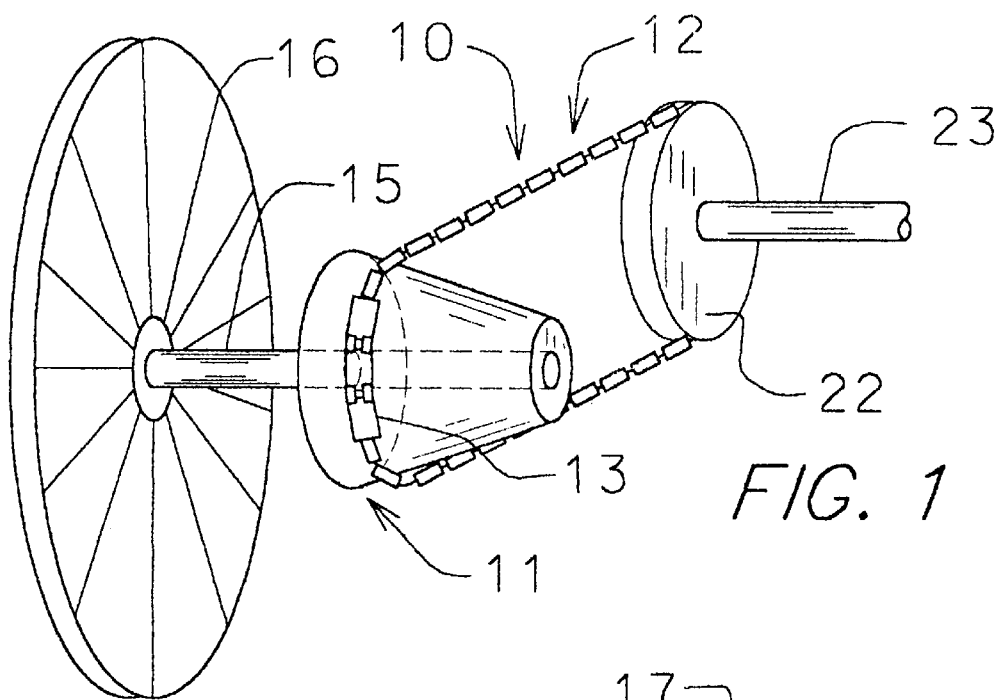
FIG. 1 is a schematic perspective view of an embodiment of the continuously variable transmission of the present invention.
Figure 2:
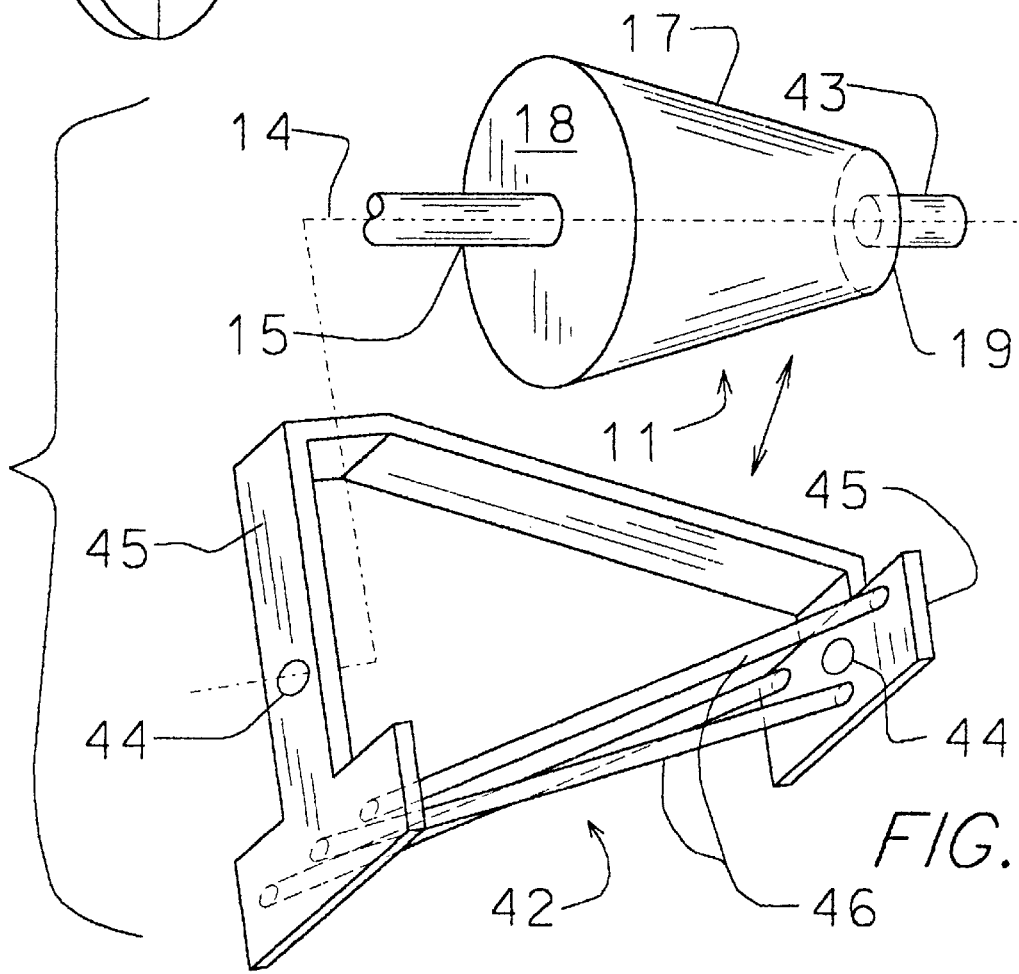
FIG. 2 is an exploded perspective view of the conical driven surface of the embodiment of FIG. 1 in association with a housing component.

Referring now to FIGS. 1–8, an embodiment of the continuously variable speed transmission 10 of the present invention is shown comprised of a conically shaped driven surface 11, endless compliant transmission member 12 interactive with surface 11, and shifting means 13 interactive with said transmission member 12.

Conically shaped driven surface 11 may be in the form of the outer surface of a hollow or solid drum 17 of frustroconical shape. Said surface 11 is centered upon horizontally oriented axis 14 which extends through shaft 15 secured to the center of vertically disposed driven wheel 16. Said drum is fabricated of metal or plastic and may be provided with an outer gripping surface comprised of rubbery or resilient material. The angle of taper of said conical surface, measured between said axis and the sloped profile of said surface may range between about 10 and 20 degrees. The length of the conical structure may range between about 2 and 5 inches, said length being measured between large plateau extremity 18 and the opposite, smaller plateau extremity 19. It is to be noted that the orientation of the taper of driven surface 11 is such that smaller extremity 19 is directed away from driven wheel 16.

Transmission member 12 is oriented in a plane substantially orthogonal to axis 14, and may be characterized as having inside and outside perimeters 20 and 21, respectively. Said inside perimeter is caused to contact driven surface 11 in about 180 degrees of circular arc adjacent smaller extremity 19 and further contacts a circular power source 22 rotatably mounted upon a shaft 23 which is parallel to shaft 15. Transmission member 12 is comprised of a central compliant wire or cable 24 of endless loop configuration and non-extensible construction, and a multitude of identical roller assemblies 25 disposed in substantially abutting relationship upon said wire. Said roller assemblies include a roller member 53 adapted to rotate about said wire while resisting axial movement along the length of the wire. Transmission member 12 is tautly positioned upon said driven surface 11 and said circular power source, and may be further characterized as having upper and lower regions 51 and 52, that move in opposite directions.

Figure 3:
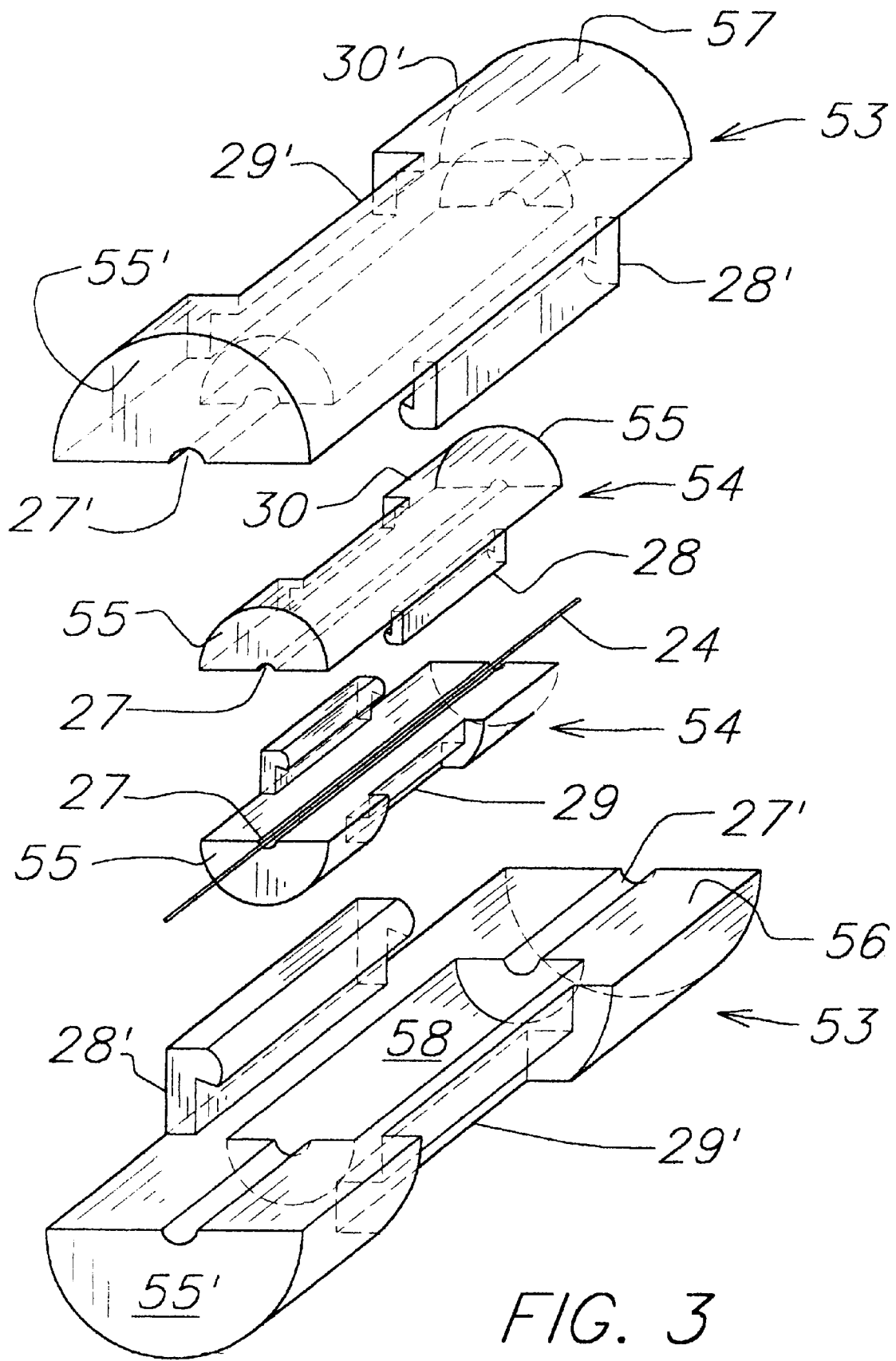
FIG. 3 is an enlarged exploded perspective view of an embodiment of a roller assembly component of the embodiment of FIG. 1.

Referring to FIG. 3, an embodiment of roller assembly 25 is shown comprised of a stationary seating member 54 adapted to securely grip wire 24, and roller member 53 adapted to rotate upon said seating member. The exemplified embodiment of seating member 54 is shown comprised of mating halves which can be snap-fitted or otherwise installed onto wire 24. Each half of seating member 54 has a centered longitudinal groove 27. When the two halves are brought together in mated relationship, said grooves meet to form a channel that tightly embraces wire 24. The joinder of the halves is achieved by way of the interaction of clip structure 28 with aligned receiving detent 29. When clipped together, the halves produce an outer surface 30 of circular cylindrical contour centered upon wire 24 and extending between parallel flat end surfaces 55.

Roller member 53 is likewise shown comprised of mating halves which can be snap-fitted or otherwise joined in a mating relationship. Each half of said roller member is bounded by opposed parallel flat end surfaces $55^1$, a longitudinal flat surface 56 extending orthogonally between said end surfaces, and a semi-cylindrical outer surface 57. Recesses 58, disposed in longitudinal surface 56, are contoured to match the outer and end surfaces of the assembled seating member. Grooves $27^1$ in surface 56 are positioned to loosely embrace wire 24. The exemplified embodiment of the halves of roller member 53 loosely embrace cylindrical surface 30 of seating member 54 so as to enable rotation thereupon while being restrained from axial movement along wire 24. The outer surfaces 57 interact to produce a circular cylindrical surface $30^1$ centered upon wire 24. Such construction of roller assembly 25 enables the transmission member to be easily positioned axially along driven surface 11 while still maintaining a non-slipping tangentially applied pulling force thereupon.

Circular power source 22 may be a pulley-type sheave having a grooved rim fitted with pockets or otherwise contoured to grip the roller assemblies. Said power source 22 may be the pedal-equipped hub of a bicycle, and driven wheel 16 may be the rear wheel of the bicycle.

Shifting means 13 in the form of an assembly of U-shaped brackets 33 is illustrated in FIGS. 4, 5 and 5A. Said brackets are elongated in an arcuate path between lateral extremities 40. The degree of curvature of said arcuate path, measured at lower extremity 41, approximates the curvature of driven surface 11 at its smaller extremity 19. The U-shaped interior 31 of said brackets is configured to accommodate roller assemblies 25, and may be provided with friction-reducing means such as ball bearings 32. The exemplified embodiment of said shifting means is comprised of three brackets 33 interengaged by pivoted coupling means 34 associated with the upper portion 35 of each bracket. Said coupling means 34 is shown comprised of interactive apertured ears 36 and pivot pins 37. Each bracket 33 is provided with guide means in the form of bores 38 adjacent upper portion 35 near the mid-length region of the bracket. The downwardly convergent angled contour of lateral extremities 40 enables the lower extremities 41 of the brackets to be in close adjacency when the shifting means is located at the smaller extremity 19 of driven surface 11, as shown in FIG. 7a. When the shifting means is located adjacent the large extremity 18 of conical surface 11, the lower extremities 41 of the brackets are further apart, as shown in FIG. 7b.

A housing 42 rotatably supports the conical structure 17 which provides driven surface 11. The manner of said rotatable support may involve for example, shaft 15 associated with said conical structure and protruding from both extremities thereof, and receiving apertures 44 in end plates 45 of housing 42, said apertures 44 providing journaled retention of the protruding portions of shaft 15.

Track means in the form of rods 46 extend between end plates 45. Said rods penetrate the guide bores 38 of brackets 33, permitting controlled sliding movement of said brackets between said end plates. By virtue of such manner of construction transmission member 12 can be axially moved by shifting means 13 to any location on conical surface 11. Movement of said shifting means may be achieved by suitable operator-manipulated lever means.

Figure 8:
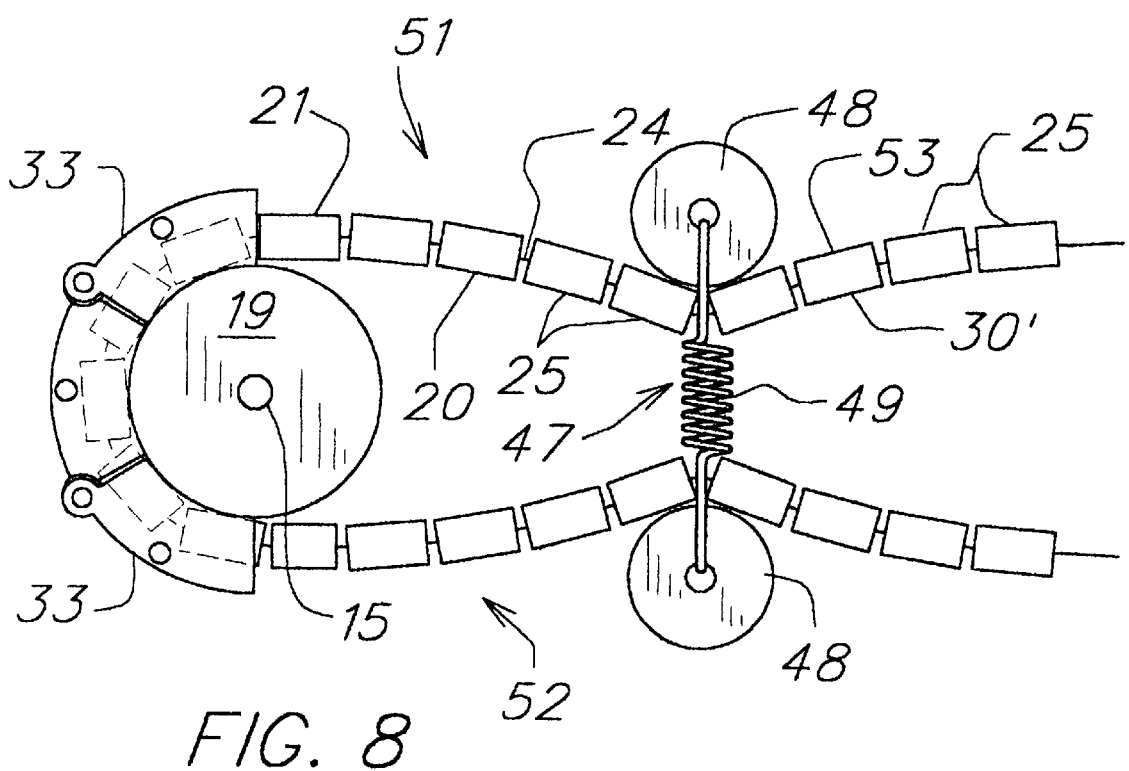
FIG. 8 is a fragmentary side view of the variable speed transmission of the present invention showing the functional deployment of said tensioning means.

FIG. 8 illustrates spring-activated tensioning means 47 in the form of paired wheels 48 joined by coil spring 49. Said wheels 48 ride upon the outside perimeter 21 of said transmission member, thereby urging together upper and lower regions 51 and 52, respectively, of said transmission member. Reciprocating movement of said wheels may be controlled by track means, not shown. Such function of tensioning means 47 maintains constant tension upon said transmission member, regardless of its site of contact with conical driven surface 11.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A continuously variable all speed transmission apparatus comprising:
   a) a conically-shaped driven surface centered upon a horizontally disposed axis of rotation,
   b) a circular power source rotating upon a shaft parallel to said axis of rotation,
   c) an endless compliant transmission member oriented in a plane substantially orthogonal to said axis of rotation and having inside and outside perimeters, said inside perimeter tautly contacting both said conically-shaped surface and said power source, said transmission member being comprised of a central wire of endless loop configuration and a multitude of identical rollers installed upon said wire and adapted to rotate about said wire while resisting movement along the length of said wire, said transmission member being disposed in a manner to define upper and lower portions that move in opposite directions,
   d) shifting means for moving said transmission member axially with respect to said axis of rotation while maintaining said inside perimeter in contact with said driven surface,
   e) a housing which rotatably supports said conically-shaped driven surface,
   f) track means associated with said housing for controlling the movement of said shifting means, and
   g) spring-activated tensioning means interactive with said upper and lower portions of said transmission member to maintain said transmission member at a uniform tension.

2. The apparatus of claim 1 wherein said conically-shaped driven surface is a drum of frustro-conical shape bounded by opposed large and small plateau extremities.

3. The apparatus of claim 2 further comprising a shaft centered upon said axis of rotation and extending in joinder between said drum and a vertically disposed driven wheel.

4. The apparatus of claim 3 wherein said small extremity is directed away from said vertically disposed driven wheel.

5. The apparatus of claim 1 wherein the angle of taper of said conically-shaped driven surface ranges between 10 and 20 degrees.

6. The apparatus of claim 1 wherein said rollers are the outer components of assemblies comprising a stationary seating member which securely grips said wire and permits rotation thereupon of said outer component roller while preventing movement in the direction of elongation of said wire.

7. The apparatus of claim 6 wherein said seating member is comprised of two components which fit together upon said wire.

8. The apparatus of claim 7 wherein said roller is comprised of two components which fit together upon said seating member.

9. The apparatus of claim 1 wherein said circular power source is a pedal-equipped hub of a bicycle.

10. The apparatus of claim 1 wherein said shifting means is comprised of several pivotally interengaged U-shaped brackets.

11. The apparatus of claim 10 wherein said brackets are elongated in an arcuate path.

12. The apparatus of claim 11 wherein each bracket is provided with guide means that slidably engage said track means.

* * * * *